(12) United States Patent
Vargas (10) Patent No.: US 10,216,924 B1
(45) Date of Patent: *Feb. 26, 2019

(54) SYSTEM AND METHODS FOR PROVIDING SECURITY TO AN ENDPOINT DEVICE AND FOR COMBATING ELECTROMAGNETIC PULSE (EMP) ATTACKS

(71) Applicant: Security Together Corporation, Roseville, CA (US)

(72) Inventor: Anthony Joseph Vargas, Roseville, CA (US)

(73) Assignee: SECURITY TOGETHER CORPORATION, Roseville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,259

(22) Filed: Mar. 6, 2018

Related U.S. Application Data (63) Continuation-in-part of application No. 14/800,579, filed on Jul. 15, 2015, now Pat. No. 9,928,359.

(51) Int. Cl.
| | | |
|---|---|---|
| G06F 21/00 | (2013.01) | |
| G06F 21/50 | (2013.01) | |
| G06F 21/86 | (2013.01) | |
| H04L 29/06 | (2006.01) | |
| G06F 21/71 | (2013.01) | |
| G06F 21/42 | (2013.01) | |
| G06F 21/78 | (2013.01) | |

(52) U.S. Cl.
CPC .............. *G06F 21/50* (2013.01); *G06F 21/42* (2013.01); *G06F 21/71* (2013.01); *G06F 21/78* (2013.01); *G06F 21/86* (2013.01); *H04L 63/1441* (2013.01); *H04L 63/308* (2013.01)

(58) Field of Classification Search
None
See application file for complete search history.

(56) References Cited

U.S. PATENT DOCUMENTS

| | | | |
|---|---|---|---|
| 5,892,900 A | 4/1999 | Ginter | |
| 5,918,194 A | 6/1999 | Banaska | |
| 6,597,255 B1* | 7/2003 | Turton | ................. H05K 9/0018 |
| | | | 310/113 |
| 7,890,925 B1 | 2/2011 | Wyatt | |
| 8,904,188 B2 | 12/2014 | Maheshwari | |
| 2004/0184610 A1 | 9/2004 | Campbell | |
| 2007/0174400 A1 | 7/2007 | Cai | |
| 2007/0291767 A1 | 12/2007 | Smith | |
| 2010/0310068 A1* | 12/2010 | Fischer | ................ H04N 7/1675 |
| | | | 380/43 |
| 2011/0271112 A1 | 11/2011 | Bajko | |
| 2011/0302646 A1 | 12/2011 | Ronda | |

(Continued)

*Primary Examiner* — Eleni A Shiferaw
*Assistant Examiner* — Andrew J Steinle
(74) *Attorney, Agent, or Firm* — Inventive Law Inc.; Jim H. Salter (57) ABSTRACT

In various example embodiments disclosed herein, physical architectures, systems, processes and methods for security are described that, at their core are adaptive and changing at determined intervals so as to present a different attack surface. In one aspect is described improvements in the improved security architecture, system and methods based upon multiple processors, operating systems, communication channels and batteries, Power Distribution Units, and Faraday cages (Faraday shielding), which can combat electromagnetic pulse (EMP) attacks.

20 Claims, 11 Drawing Sheets

(56) References Cited

U.S. PATENT DOCUMENTS

| | | |
|---|---|---|
| 2013/0283296 A1 | 10/2013 | Brown |
| 2014/0325239 A1 | 10/2014 | Ghose |
| 2016/0065612 A1* | 3/2016 | Evans .................... G06F 21/53 726/22 |
| 2016/0232358 A1 | 8/2016 | Grieco |

* cited by examiner

SYSTEM AND METHODS FOR PROVIDING SECURITY TO AN ENDPOINT DEVICE AND FOR COMBATING ELECTROMAGNETIC PULSE (EMP) ATTACKS

PRIORITY PATENT APPLICATION

This is a non-provisional continuation-in-part (CIP) patent application claiming priority to U.S. patent application Ser. No. 14/800,579, filed Jul. 15, 2015. This non-provisional CIP patent application claims priority to the referenced patent application. The entire disclosure of the referenced patent application is considered part of the disclosure of the present application and is hereby incorporated by reference herein in its entirety.

TECHNICAL FIELD

The disclosed subject matter relates to the field of computing systems, data processors, multi-processor systems, operating systems, and data security systems, and particularly although not exclusively, to improved security architectures, systems, and methods based upon multiple processors, operating systems, and communication channels, power distribution, and protective physical casing (e.g., Faraday cage) for combating electromagnetic pulse (EMP) attacks.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2018, Security Together Corporation; All Rights Reserved.

BACKGROUND

Today's current electronic system architectures have inherent deficiencies that make defending against cyber attacks extremely difficult and many times impossible. Current electronic architectures are limited in how they can deal with an ever changing array of attacks. Companies focus on making networks or electronic devices more secure. Unfortunately, this strategy can only go so far as the platforms and architectures that these networks and electronic devices rely on are insecure.

SUMMARY

Described are architectures, systems, processes and methods for security that, at their core, are adaptive and changing at determined intervals so as to present a different environment, a portion of which is a varied attack surface, to the communications world exterior to the system.

In one aspect is described improved security architecture, system and methods based upon multiple processors, operating systems and communication channels, in which at least some processors each perform as an input system connectable to a network, and are dissimilar in some manner, the manner of dissimilarity being controlled by a control system that is not connected to the network. Additionally in this aspect, an execution system is included which performs execution based upon received inputs to the input system, which are passed to the execution system once validated as being safe and not compromised.

In another aspect, a multi-channel internal bus is provided that includes parallel communication lines and exists to provide an even more secure environment.

In another aspect, the described architectures, systems, processes and methods for security are extended to combat electromagnetic pulse (EMP) attacks using protective physical casing (e.g., Faraday cage).

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

The described Dynamic Security Architecture Environment (DSAE), in which there is component isolation, is also referred to as a DSAE system, keeps attackers at bay by shifting and changing the attack surface so that an attack is much more difficult to occur on the DSAE system, as it is much more difficult to attack a system when you don't know what you are attacking and when the attack surface is continuously changing.

Aspects described in further detail herein are that the DSAE system is based on a modular architecture in which the input system is hardware isolated from the execution system running an application, and a control system that interfaces between the input system and the execution system is not only hardware isolated from both the input system and the execution system, but is also not directly connectable to the external network.

The DSAE architecture described further hereinafter puts in place periodic checks and balances. This is different than conventional architectures in the industry because it is a combined architecture, hardware, software, and process solution. Current systems have limited protections, which by themselves have been able to be compromised, which has led to a system compromise and thus a loss of availability.

As mentioned previously, the DSAE architecture allows for the attack surface to be continually varied. Contrast this with current electronic devices where an attacker will know the specific attack surface, for example the attacker will know the common Internet browser and applications based on the operating system. So the attacker will know the likely attack surface and hence the attacks which will likely be successful. When running with the DSAE architecture, the adversaries don't know exactly what the environment is expected to be or what operating system and applications are running. The DSAE architecture is also unique in that it has the ability to make intelligent decisions in real time so it reduces the possibility of a single point of failure in the environment.

In one particular aspect, the DSAE architecture has the ability to make inquiries about the input units. After receiving answers to those inquiries, the system is able to determine the best environment to run a particular application or input message or file. A DSAE system also obtains forensics about the input so that an attack can be re-created for purposes of evidence.

In addition to determining the safest and most secure execution environment, the DSAE architecture will dynamically assign risk levels so when an input unit requests a specific service the system is able to use historical baselines and customer-determined parameters to make instantaneous decisions on whether and where to run an input unit. Example outcomes are to run in a hardware-isolated environment, to run on multiple hardware-isolated environments or run in an environment which has network access. In addition, more questions can be asked and the environment continually changing, implying a constantly-shifting attack surface. With this changing attack surface an attack that just worked a moment before will likely not succeed a moment later. A DSAE system provides a static risk score and a dynamic risk awareness score. This provides a constant evaluation of the riskiness of certain activities on a DSAE system, and thus can help drive accountability.

Some attacks may not run immediately but rather might be delayed for a certain period of time. When a delayed attack is initially injected into the system it interrogates the hardware and software components at that point in time and determines the attack will be successful. Due to the changing state of the system, when the attack is launched the hardware and software components are likely to be different and therefore the attack will most likely fail.

The DSAE architecture will also track authentication credentials for users and those credentials will be offloaded from the operating system running the authentication. With this offloading, there is limited ability to compromise the credentials eliminating certain types of attacks against the system. Privilege escalations attacks are harder to implement against a DSAE system due to a separation of heightened privileges. Additionally, a DSAE system can create and store dynamically generated passwords so that passwords on a DSAE system always change dynamically without the need for the user to know of all the passwords.

As background, it is important to note that with multiple isolated processors (processors that reside on hardware modules) as described herein, substantially real-time determinations can take place regarding whether the system has been compromised, such that within seconds of an attack beginning, counter steps can be taken to address it. As such, the DSAE architecture has, in embodiments described, this characteristic. On systems without multiple isolated hardware processors, a system has no way to determine in real time whether it has been compromised. Once code loads and executes on a non-isolated chip there is no way for that processor to determine if it is running compromised or malicious code. A DSAE system has the checks and balances so that no, one, single compromise of an isolated processor can bring down the entire system. Other processors will watch the running chip to make sure any compromise is contained, which is particularly useful within Internet of Things (IoT) devices and environments.

With the DSAE architecture in place in a system, there is also the ability to provide a DSAE Assurance Score: This term means providing scores dynamically so the end user or administrator knows the riskiness of their current behavior. The score is calculated both dynamically and statically. The score is computed statically by the organization, data owner or organizational policies for certain tasks. Each task receives a static risk assurance score, which determines allowed DSAE configurations that get created by the use of different DSAE Ingredients. DSAE Ingredients have both static initial DSAE Assurance Scores that get generated based on the scores of known components. After a base DSAE Configuration is created using DSAE Ingredients the score is further calculated based on dynamic variables to the environment, user accounts, tasks, functional workflows, etc. If a DSAE Assurance Score cannot be achieved, a workflow or task will not run without a third-party intervention. DSAE Monitoring. One principle of a DSAE machine is that other hardware components in the system monitor whether a processes compromises a system (and thus the availability of the system). The DSAE Architecture is more than just High-Availability (HA) because it uses stored historical information and dynamic runtime information that is accessed by a different hardware component to determine if a processor was compromised and thus unavailable.

One principle of a DSAE machine is that other hardware components in the system monitor whether a processes compromises a system (and thus the availability of the system). The DSAE Architecture is more than just High-Availability (HA) because it uses stored historical information that is accessed by a different hardware component to determine if a processor was compromised and thus unavailable.

The DSAE system uses a DSAE Protocol that the components and modules within a DSAE system use to communicate. The protocol is a dynamic protocol, as described herein, that can change based on the environment, workloads, data sets and variances in system performance. The protocol adapts transparently based on dynamic needs, and preferably does this by adding a header to normal internal message, which internal messaging also passes received external data. The added head may contain, for example, additional fields such as message type, priority, ratings, or priority classification. A message type will be, for example "stop sending these messages type" or a "continue sending these messages type"; ratings will be like those of a movie, and priority having a time-sensitivity based aspect thereto; whereas confidentiality classification having a sensitivity aspect, such as secret, top secret, etc.

Additionally, the protocol is both an internal DSAE protocol, yet it will also be an open Internet protocol at some point in the future. For now, the protocol has both an Internal and External implementations. Additionally, the protocol is very structured in the messaging format and the state of the protocol is kept track of continually. Additional details of the various example embodiments of the DSAE architecture, systems and protocols are provided in the disclosure of the above-referenced patent application, which is incorporated by reference herein in its entirety.

Security Architectures, Systems, and Methods for Combating Electromagnetic Pulse (EMP) Attacks In various example embodiments, the DSAE security architecture was designed to combat and defeat cyber attacks. The new additions in this application aim to protect the electrical components of the DSAE security architecture against electromagnetic pulse (EMP) attacks, which reside in the physical world. The digital/cyber realms and the physical world are intertwined, in that an attack or event against the digital/cyber world, can lead to a disruption of a vital service in the physical world. The inverse is also true, that a disruption in the physical world can cause an outage or disruption to a digital device or service.

In a DSAE security architecture, a user could be a human or other animal species, another computer or machine or an automated computer program.

In an electronic device that uses the DSAE security architecture, by design the logical systems (Input, Operational, Execution, and User systems) of the DSAE architecture operate on one or more isolated hardware modules (processing units). In a DSAE system that only has one hardware module per logical DSAE system, a DSAE system has the ability to run some components (such as heartbeats, some process state information) in an advanced logical software state to keep the full DSAE system available, which causes the DSAE security architecture logical systems (User, Input, Execution, and Operational) out of DSAE hardware isolation mode and also causes the DSAE logical systems (User, Input, Execution, and Operational) to cross logical system boundaries. This is not an ideal embodiment of the DSAE security architecture.

Figure 1:
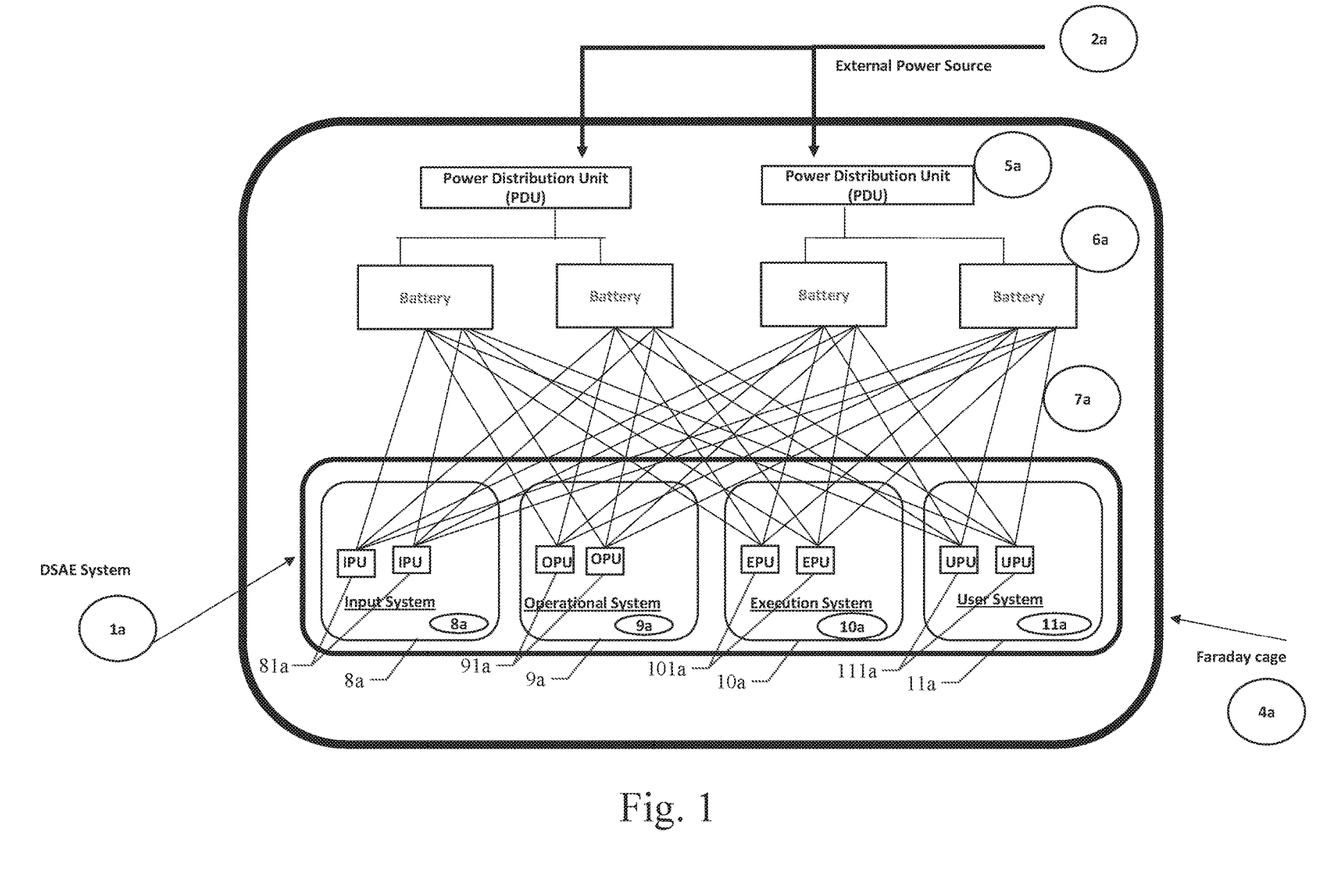
FIG. 1 illustrates an example embodiment of an electronic device, encased in a Faraday cage, that is using the Dynamic Security Architecture Environment (DSAE) security architecture and one External Power Source, with two processing modules (hardware) in each DSAE logical system (User, Operational, Execution and Input system)
Figure 8:
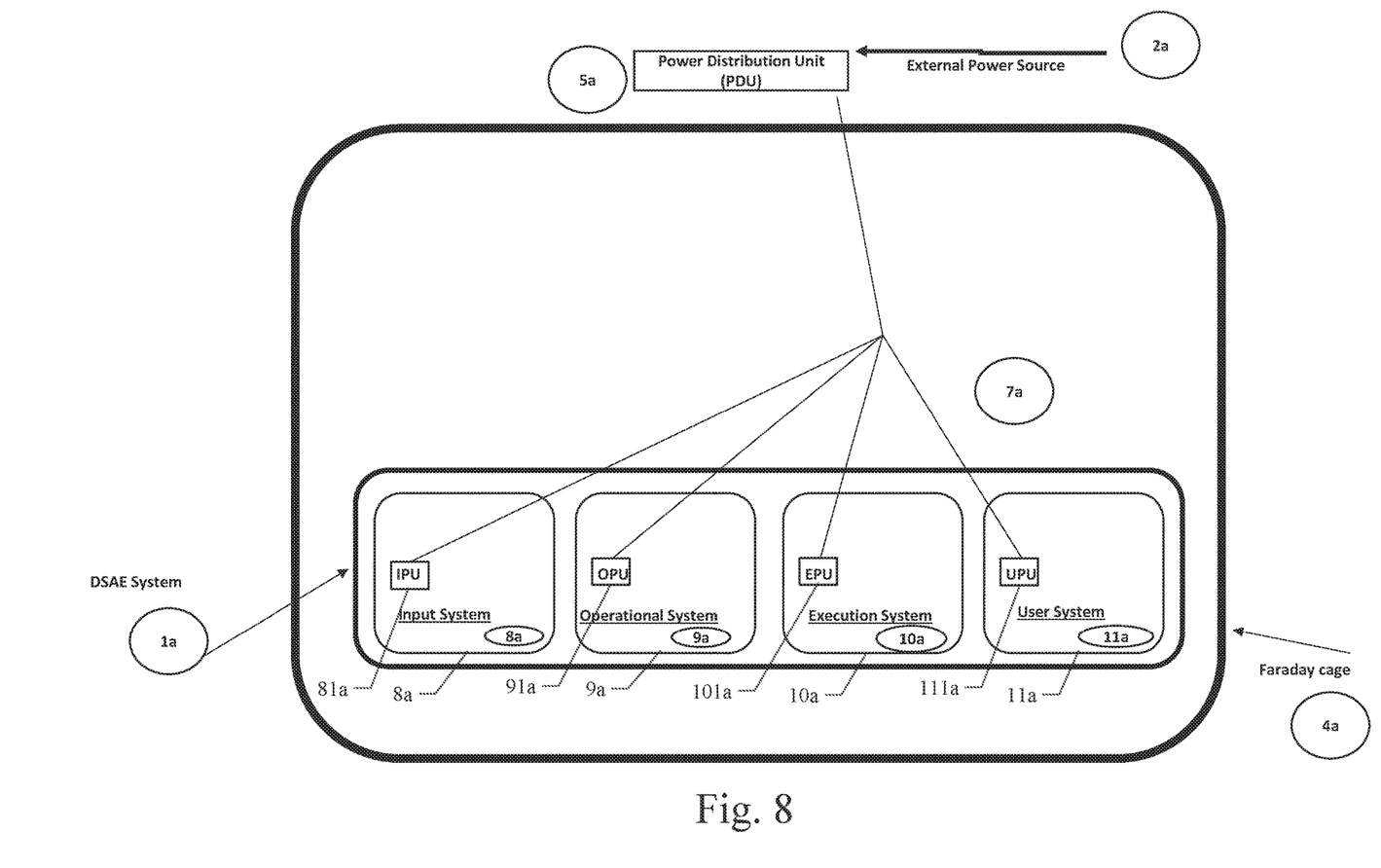
FIG. 8 illustrates an example embodiment of an electronic device, encased in a Faraday cage, that is using the DSAE security architecture and one Power Distribution Unit external to the Faraday cage directly powering the DSAE architecture, with one processing module (hardware) in each DSAE logical system (User, Operational, Execution and Input system)
Figure 9:
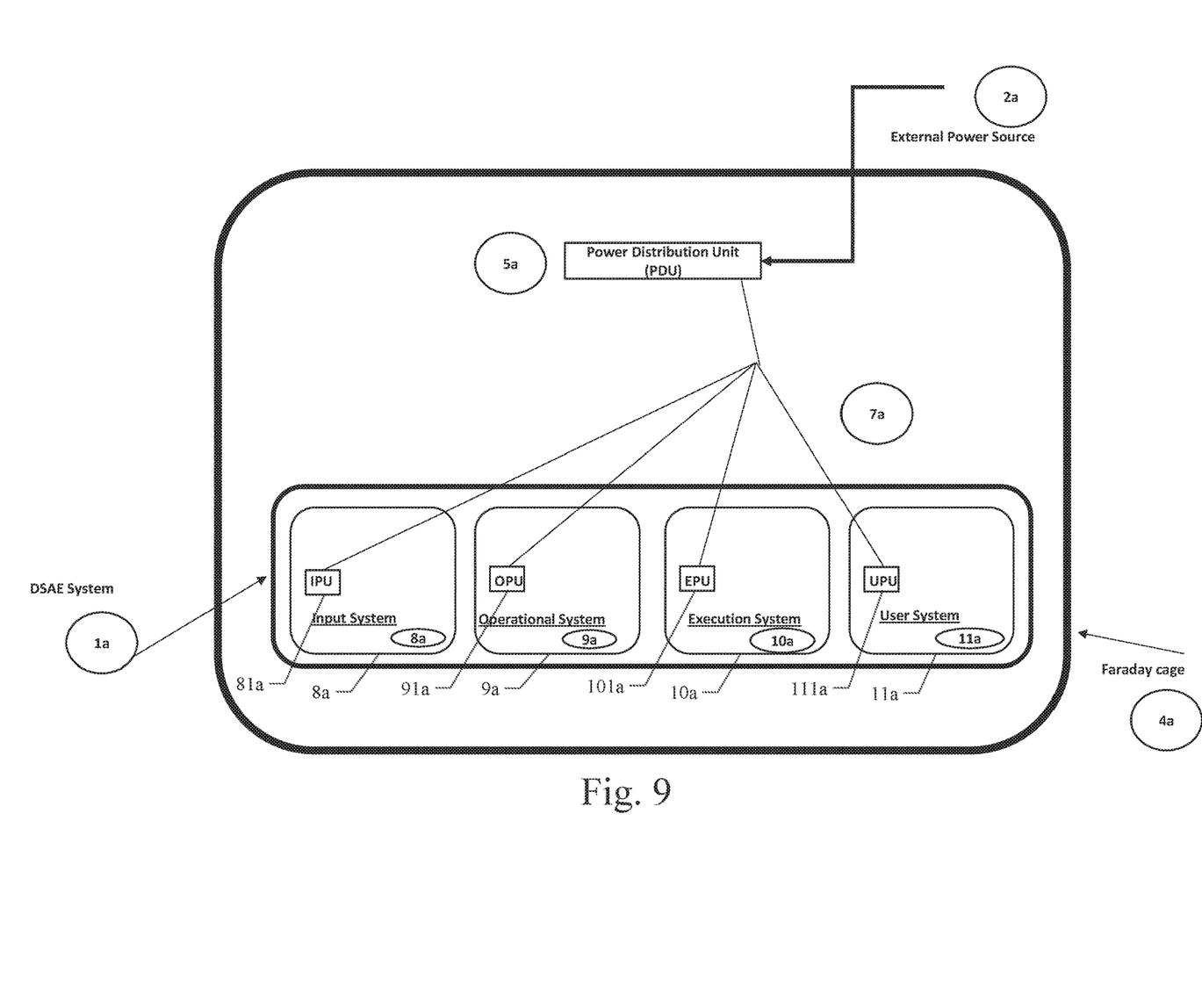
FIG. 9 illustrates an example embodiment of an electronic device, encased in a Faraday cage, that is using the DSAE security architecture and one Power Distribution Unit internal to the Faraday cage directly powering the DSAE architecture, with one processing module (hardware) in each DSAE logical system (User, Operational, Execution and Input system)

Referring now to FIG. 1, the DSAE security architecture of an example embodiment comprises a DSAE system 1*a* including a plurality of logical software systems: an Input System (FIG. 1, 8*a*), an Execution System (FIG. 1, 10*a*), a User System (FIG. 1, 11*a*), and an Operational System (also sometimes referred to as the Control System) (FIG. 1, 9*a*). The example embodiment also includes hardware processing units: IPU (Input Processing Unit) 81*a*, OPU (Operational Processing Unit) 91*a*, EPU (Execution Processing Unit) 101*a*, and UPU (User Processing Unit) 111*a*. The IPU 81*a*, OPU 91*a*, EPU 101*a*, and UPU 111*a* are also called processing modules. The components of the DSAE system 1*a* can reside on electrical boards that contain the processing units/processing modules, which are the physical components of the DSAE security architecture. The DSAE system (FIG. 1, 1*a*) is a collection of all those hardware processing modules, which can include the logical DSAE systems (User System 11*a*, Operational System 9*a*, Input System 8*a*, and Execution System 10*a*), which yield a secure electronic device that is tamper resistant, and able to defeat cyber attacks. In FIGS. 1 through 11, reference number "7*a*" corresponds to wires or electrical connections that connect power from elements of hardware to a power source, such as batteries 6*a*. The DSAE security architecture can be implemented on many different types of electronic devices.

The example embodiment of DSAE system 1*a* shown in FIG. 1 contains both logical, and physical components. Together, the logical and physical components create a new system. In addition to some of the original DSAE components mentioned above, FIG. 1 also illustrates an outer casing that is called a Faraday Cage or Faraday Shield 4*a*. Faraday Cages and Faraday Shields are physical, hardware enclosures that block electromagnetic energy from damaging electrical equipment that resides inside the Faraday cage (FIG. 1, 4*a*). In FIG. 1, one External Power Source (EPS) (FIG. 1, 2*a*) feeds electrical power into Power Distribution Units (FIG. 1, 5*a*) that then provide power to one or more batteries (FIG. 1, 6*a*). Depending on the type of electronic device, some devices need more power than others. Some electronic devices will need a significant flow of external power (FIG. 1, 2*a*) to continually charge internal batteries and some other electrical devices will only need access to external power (FIG. 1, 2a) at various times throughout the day, as the internal batteries (FIG. 1, 6a) may be able to provide enough power for hours, days, weeks or potentially even years to a device leveraging the DSAE security architecture as disclosed herein.

FIG. 1, shows an electronic device using the DSAE architecture that has one External Power Source (FIG. 1, 2a) that supplies power to a Power Distribution Unit (PDU) (FIG. 1, 5a) inside the Faraday cage (FIG. 1, 4a). In this example embodiment, the External Power Source (EPS) 2a would only supply power to one Power Distribution Unit (PDU) 5a at one time. It is also possible that the External Power Source 2a does not supply any power to any PDU 5a at a time. An External Power Source 2a can also power both PDU's 5a at the same time, yet this is not an advised configuration. Additionally, a system may only have one PDU 5a and/or battery 6a inside the Faraday cage, yet this is not an advised configuration (e.g., see FIGS. 6 and 7). It is also possible to have the PDU 5a power the DSAE system 1a directly, yet this is also not an advised configuration (e.g., see FIGS. 8 and 9). FIG. 1 also shows an example of an electronic device using the DSAE security architecture with two processing modules in each DSAE logical system (User 11a, Input 8a, Operational 9a, and Execution 10a systems).

Figure 2:
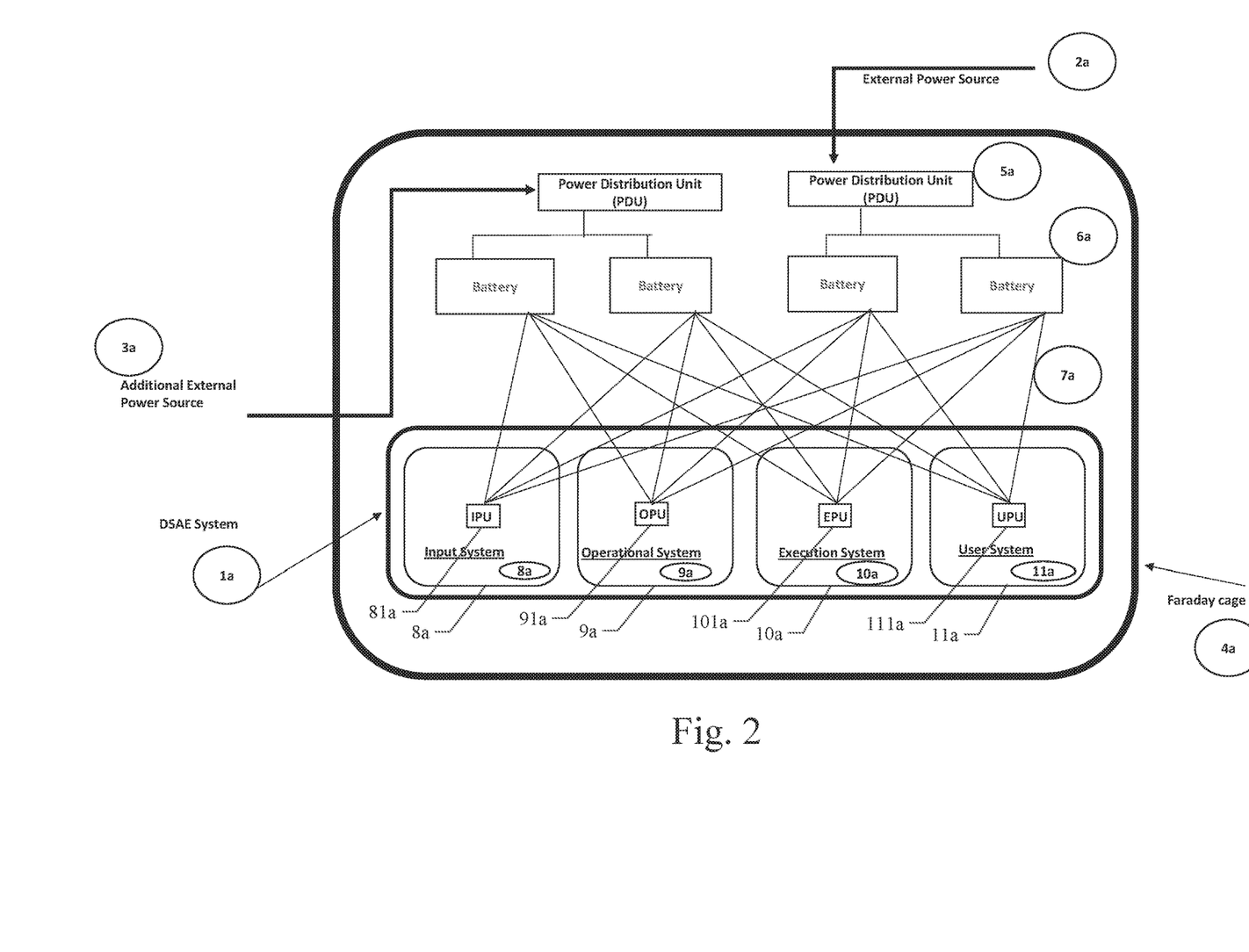
FIG. 2 illustrates an example embodiment of an electronic device, encased in a Faraday cage, that is using the DSAE security architecture and two External Power Sources, with one processing module (hardware) in each DSAE logical system (User, Operational, Execution and Input system)

FIG. 2 illustrates an example embodiment of an electronic device using the DSAE architecture that has two External Power Sources (FIGS. 2, 2a and 3a) that supply power to Power Distribution Units (FIG. 2, 5a) inside the Faraday cage (FIG. 2, 4a). In this example embodiment, the External Power Sources (FIGS. 2, 2a and 3a) can provide power to both Power Distribution Units (PDUs) 5a at the same time, one PDU 5a at a time, or neither PDU 5a at the same time. Additionally, a system may only have one PDU 5a and/or battery 6a inside the Faraday cage 4a, yet this is not an advised configuration (e.g., see FIGS. 6 and 7). It is also possible to have the PDU 5a power the DSAE system 1a directly, yet this is also not an advised configuration (e.g., see FIGS. 8 and 9). FIG. 2, also shows an example of an electronic device using the DSAE security architecture with one processing module in each DSAE logical system (User 11a, Input 8a, Operational 9a, and Execution 10a systems). However, more processing modules can be added to each DSAE logical system.

Figure 3:
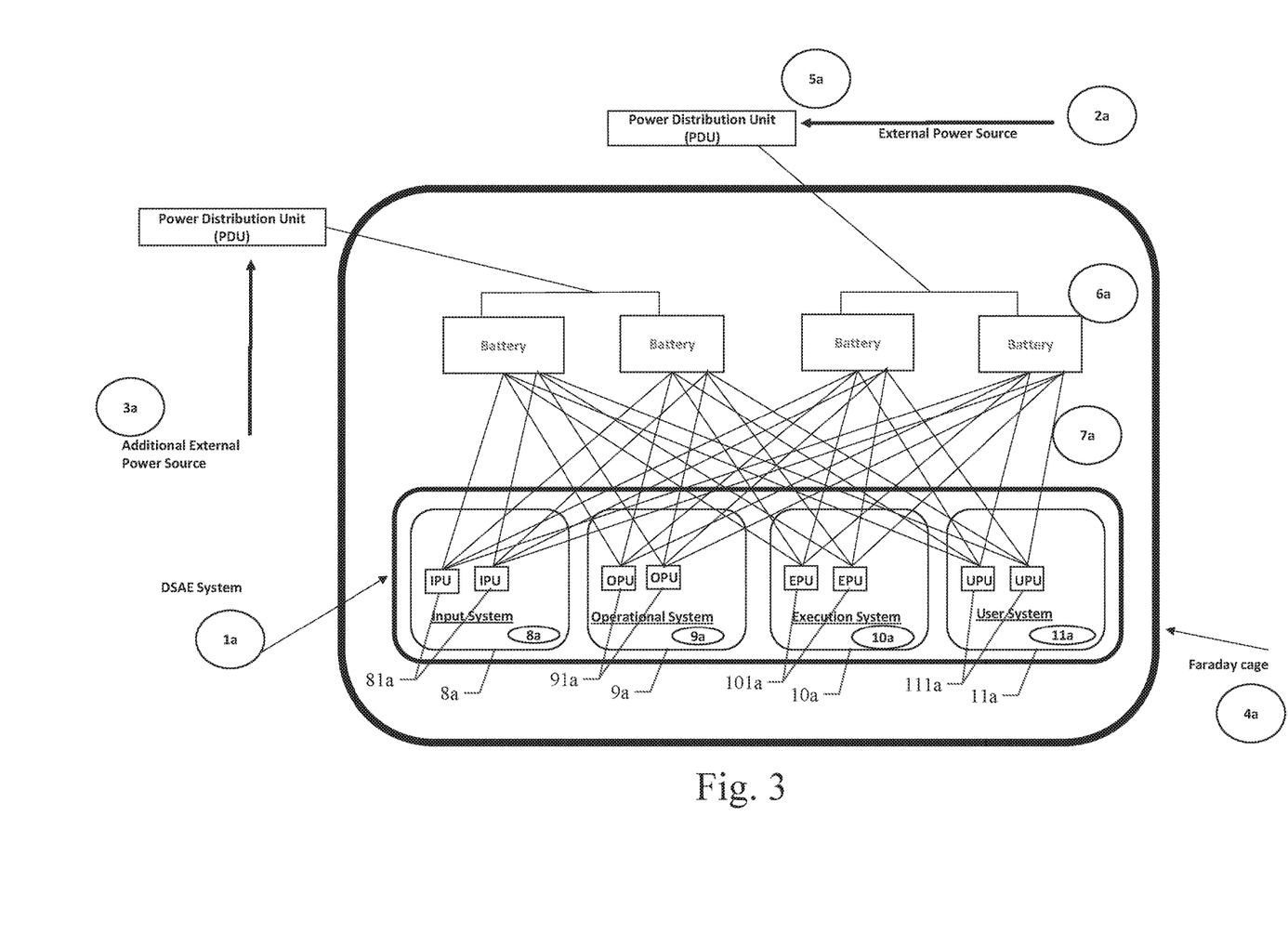
FIG. 3 illustrates an example embodiment of an electronic device, encased in a Faraday cage, that is using the DSAE security architecture and two External Power Sources and two Power Distribution Units external to the Faraday cage, with two processing modules (hardware) in each DSAE logical system (User, Operational, Execution and Input system)

FIG. 3 illustrates an example embodiment of an electronic device, encased in a Faraday cage 4a, that is using the DSAE security architecture (1a) with two External Power Sources 2a and 3a and two Power Distribution Units 5a external to the Faraday cage 4a, with two processing modules (hardware) in each DSAE logical system (User 11a, Input 8a, Operational 9a, and Execution 10a systems).

Figure 4:
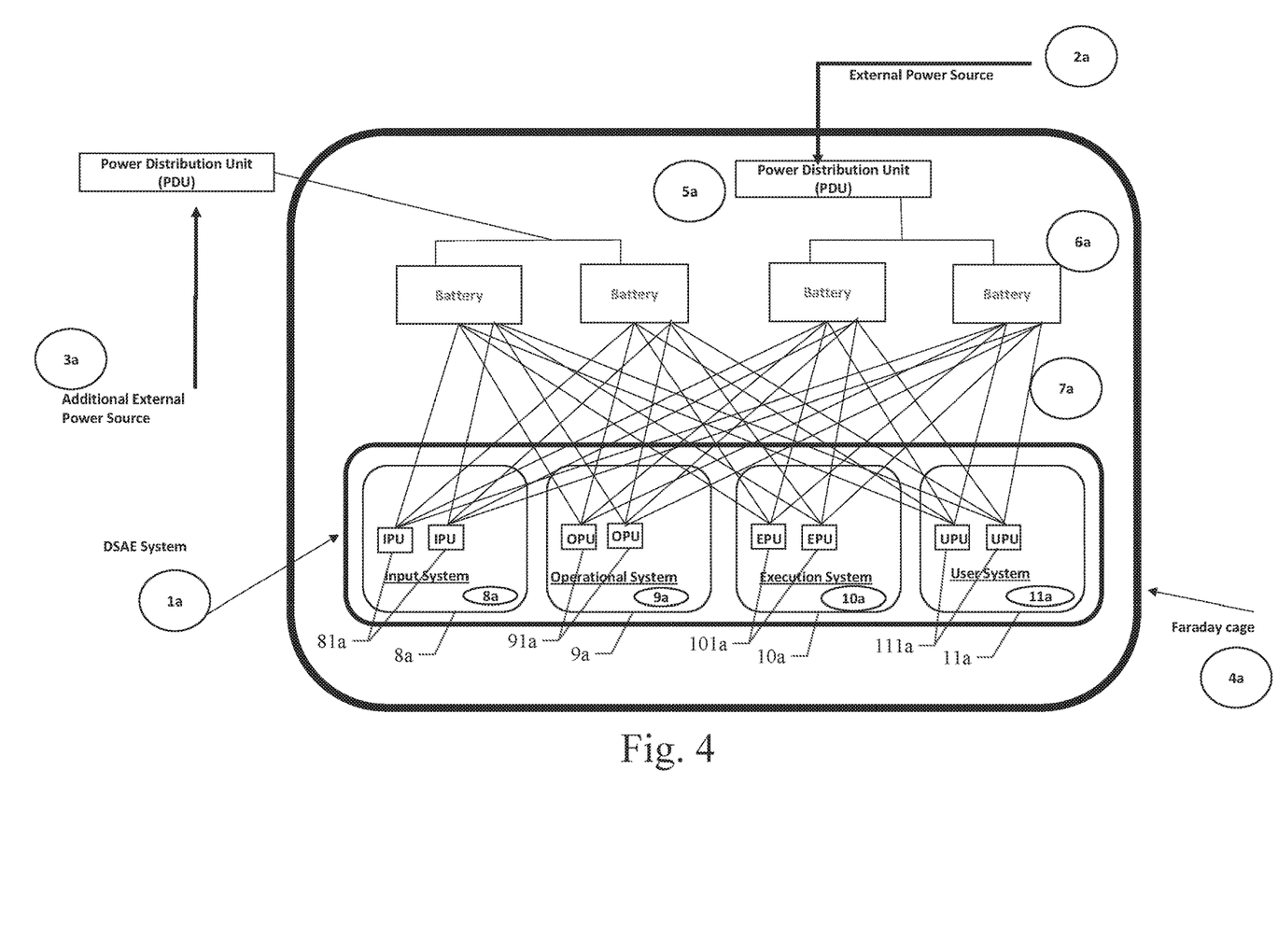
FIG. 4 illustrates an example embodiment of an electronic device, encased in a Faraday cage, that is using the DSAE security architecture and two External Power Sources and one external Power Distribution Unit outside the Faraday cage and one internal Power Distribution Unit to the Faraday Cage, with two processing modules (hardware) in each DSAE logical system (User, Operational, Execution and Input system)

FIG. 4 illustrates an example embodiment of an electronic device, encased in a Faraday cage 4a, that is using the DSAE security architecture (1a) with two External Power Sources 2a and 3a and one external Power Distribution Unit outside the Faraday cage 4a and one internal Power Distribution Unit 5a to the Faraday cage 4a, with two processing modules (hardware) in each DSAE logical system (User 11a, Input 8a, Operational 9a, and Execution 10a systems).

Figure 5:
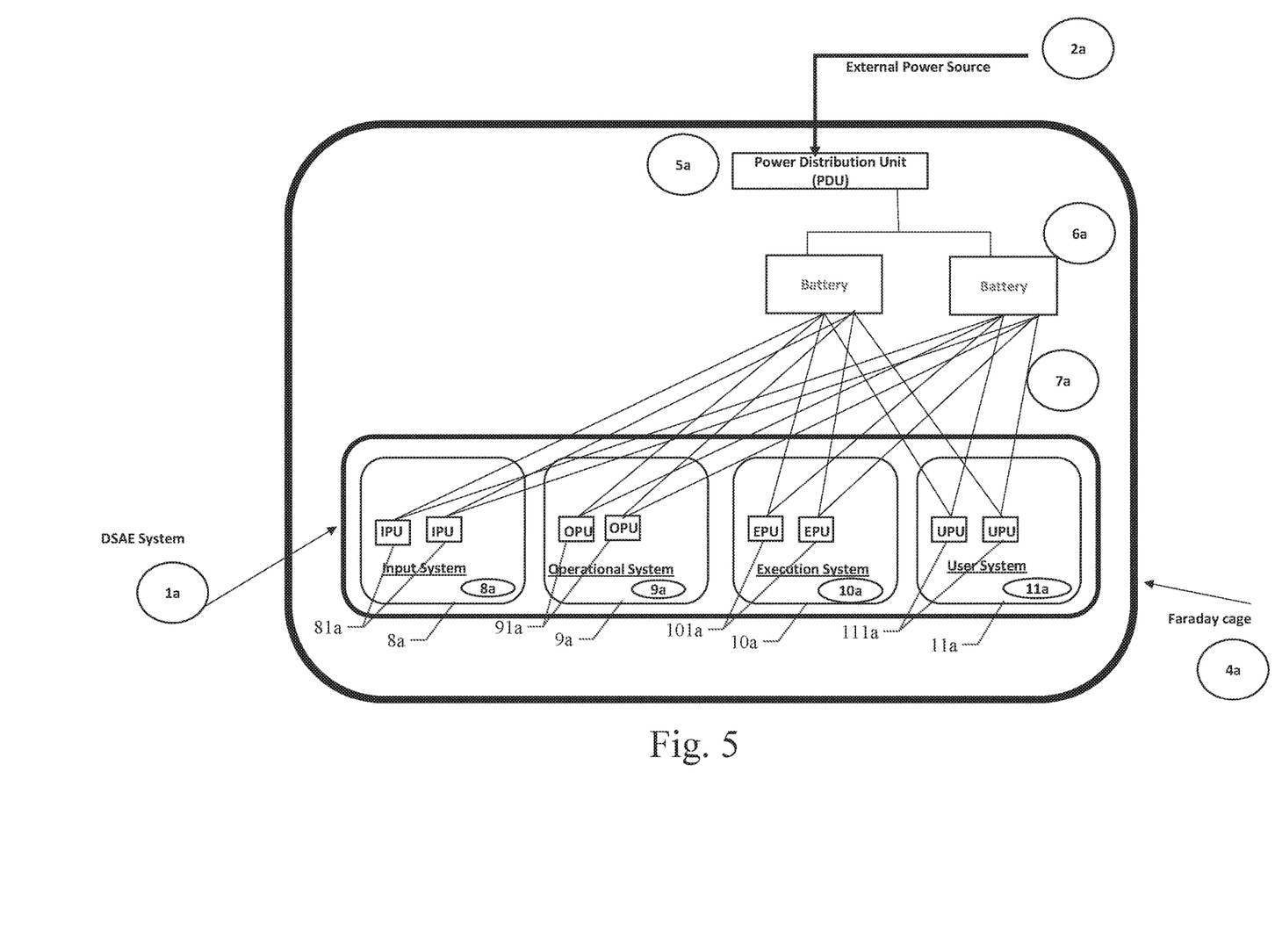
FIG. 5 illustrates an example embodiment of an electronic device, encased in a Faraday cage, that is using the DSAE security architecture and one Power Distribution Unit (PDU) and two batteries with two processing modules (hardware) in each DSAE logical system (User, Operational, Execution and Input system)

FIG. 5 illustrates an example embodiment of an electronic device, encased in a Faraday cage 4a, that is using the DSAE security architecture (1a) with one Power Distribution Unit 5a and two batteries 6a with two processing modules (hardware) in each DSAE logical system (User 11a, Input 8a, Operational 9a, and Execution 10a systems).

Figure 6:
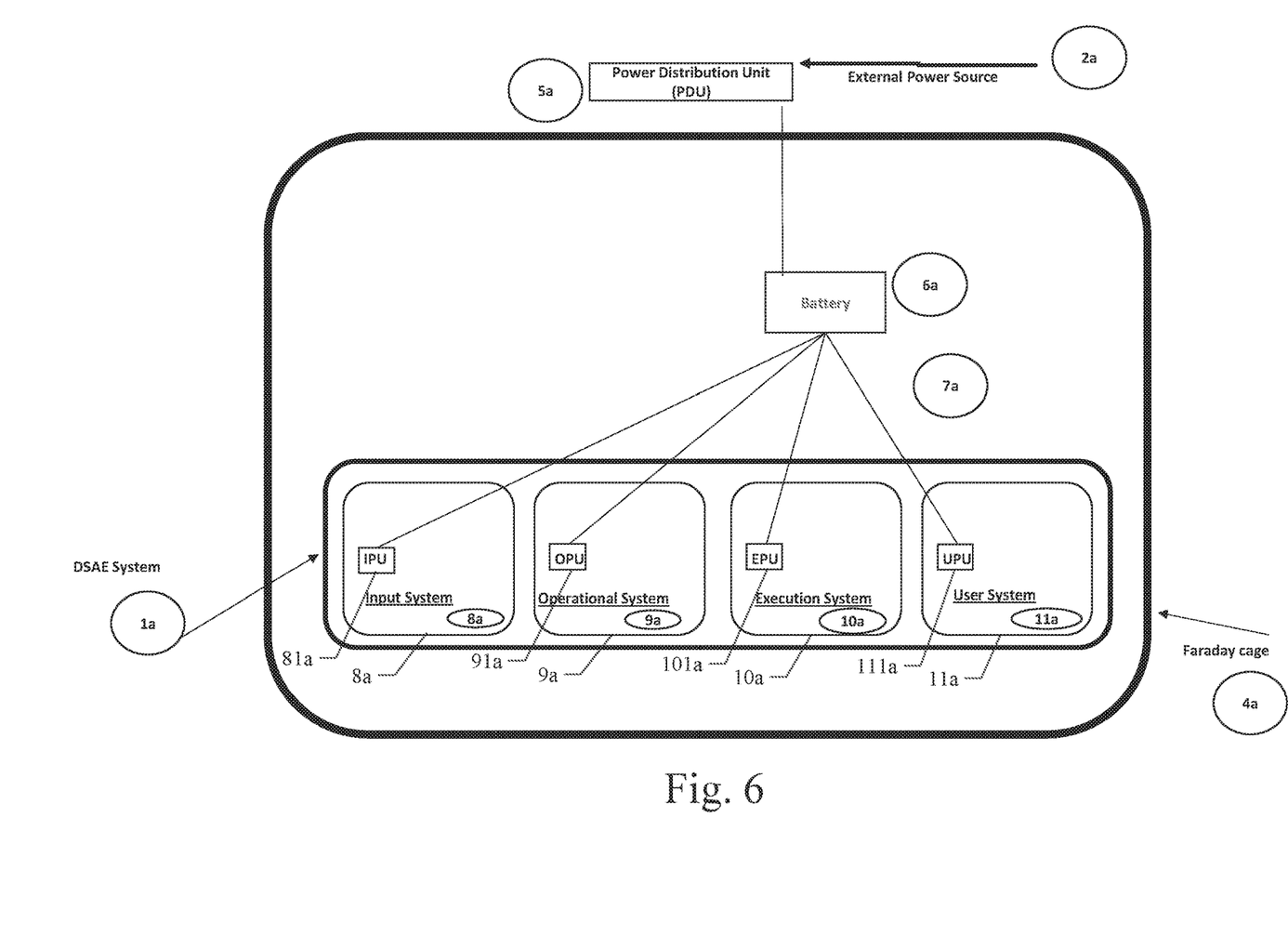
FIG. 6 illustrates an example embodiment of an electronic device, encased in a Faraday cage, that is using the DSAE security architecture and one Power Distribution Unit (PDU) external to the Faraday cage and one battery supplying power to the DSAE architecture, with one processing module (hardware) in each DSAE logical system (User, Operational, Execution and Input system)

FIG. 6 illustrates an example embodiment of an electronic device, encased in a Faraday cage 4a, that is using the DSAE security architecture (1a) with one Power Distribution Unit 5a external to the Faraday cage 4a and one battery 6a supplying power to the DSAE architecture, with one processing module (hardware) in each DSAE logical system (User 11a, Input 8a, Operational 9a, and Execution 10a systems).

Figure 7:
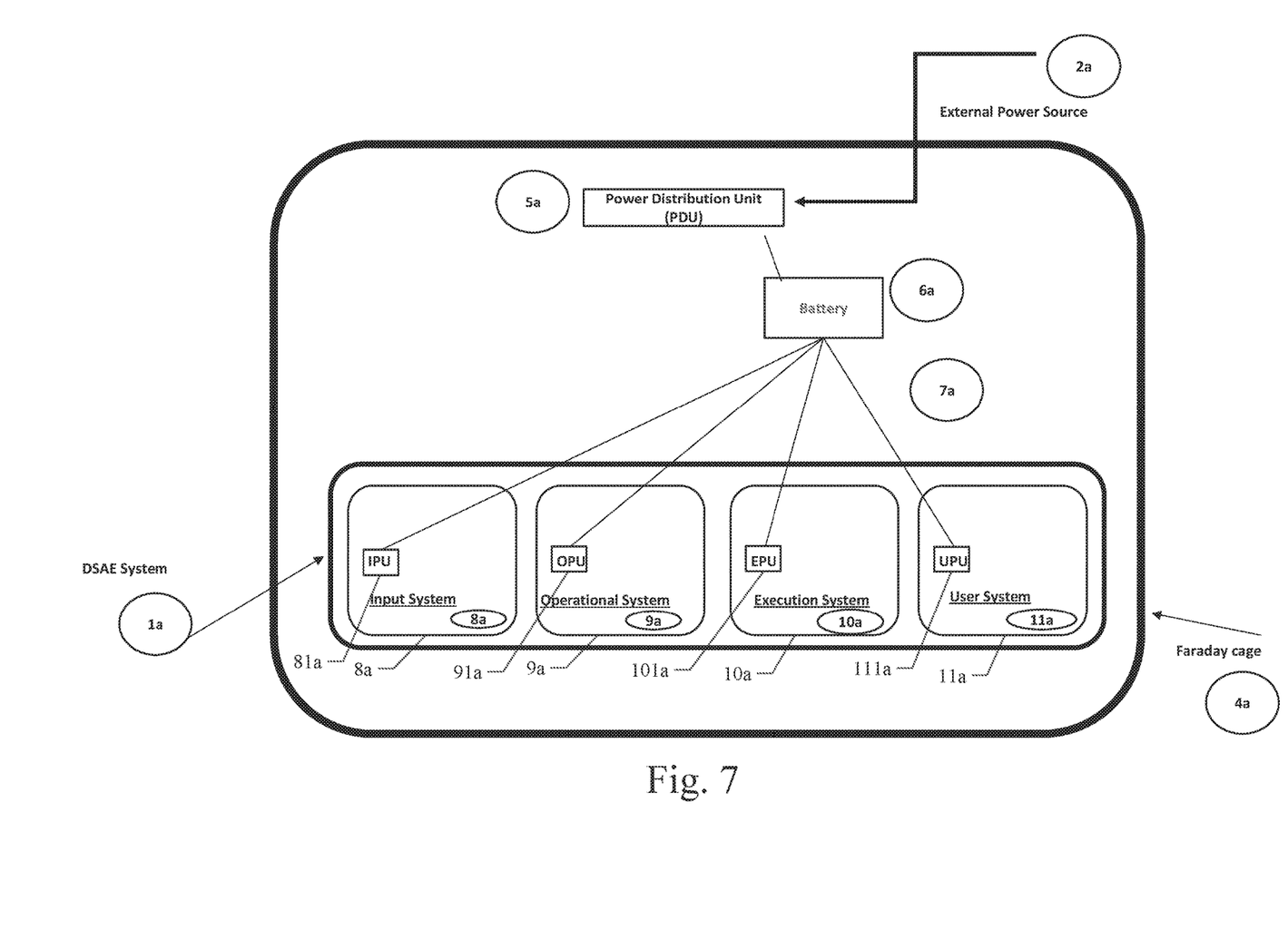
FIG. 7 illustrates an example embodiment of an electronic device, encased in a Faraday cage, that is using the DSAE security architecture and one Power Distribution Unit internal to the Faraday cage and one battery supplying power to the DSAE architecture, with one processing module (hardware) in each DSAE logical system (User, Operational, Execution and Input system)

FIG. 7 illustrates an example embodiment of an electronic device, encased in a Faraday cage 4a, that is using the DSAE security architecture (1a) and one Power Distribution Unit 5a internal to the Faraday cage 4a and one battery 6a supplying power to the DSAE architecture, with one processing module (hardware) in each DSAE logical system (User 11a, Input 8a, Operational 9a, and Execution 10a systems).

FIG. 8 illustrates an example embodiment of an electronic device, encased in a Faraday cage 4a, that is using the DSAE security architecture (1a) with one Power Distribution Unit 5a external to the Faraday cage 4a directly powering the DSAE architecture, with one processing module (hardware) in each DSAE logical system (User 11a, Input 8a, Operational 9a, and Execution 10a systems).

FIG. 9 illustrates an example embodiment of an electronic device, encased in a Faraday cage 4a, that is using the DSAE security architecture (1a) with one Power Distribution Unit 5a internal to the Faraday cage 4a directly powering the DSAE architecture, with one processing module (hardware) in each DSAE logical system (User 11a, Input 8a, Operational 9a, and Execution 10a systems).

Figure 10:
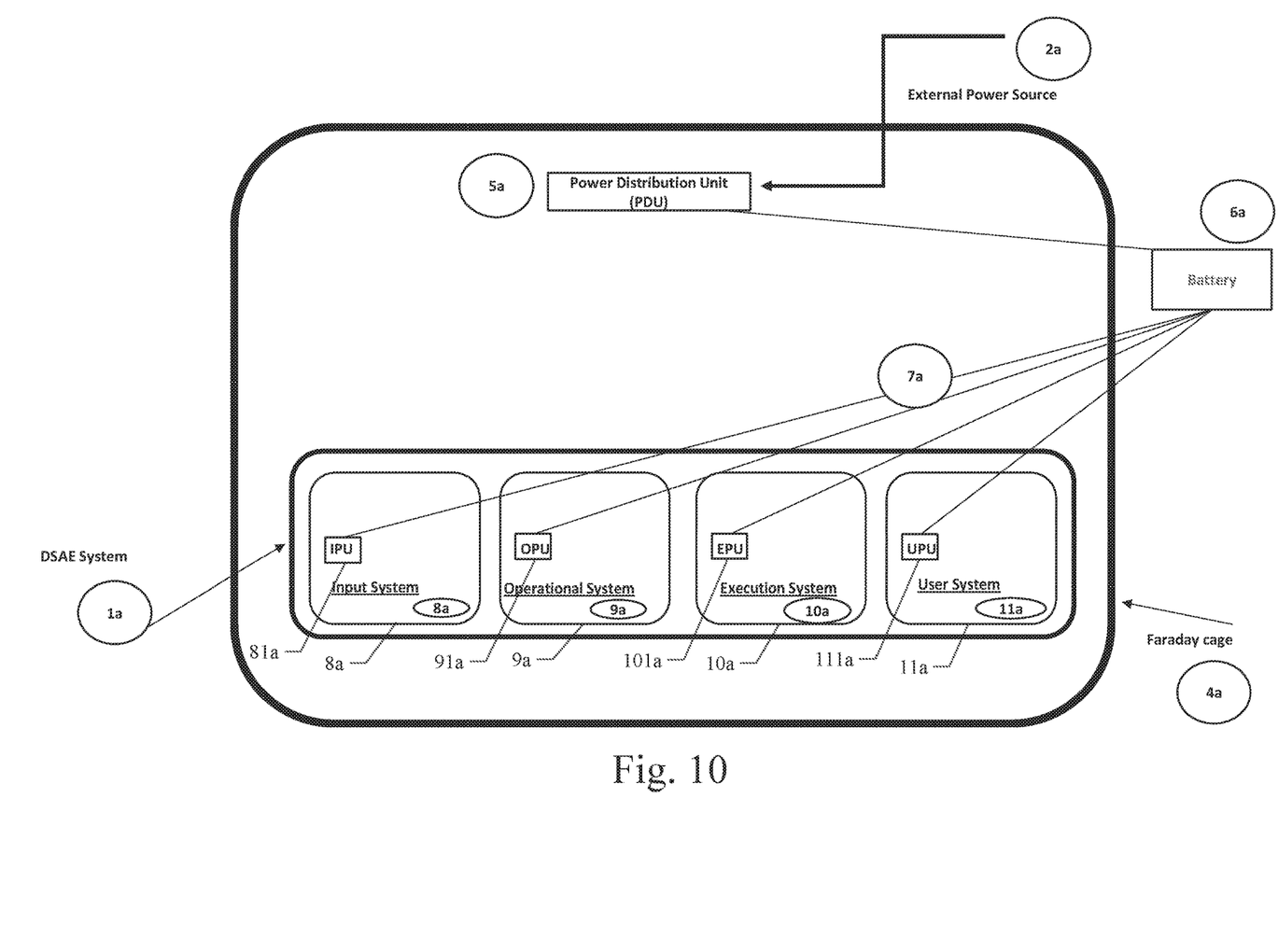
FIG. 10 illustrates an example embodiment of an electronic device, encased in a Faraday cage, that is using the DSAE security architecture and one Power Distribution Unit internal to the Faraday cage and one battery external to the Faraday cage supplying power to the DSAE architecture, with one processing module (hardware) in each DSAE logical system (User, Operational, Execution and Input system)

FIG. 10 illustrates an example embodiment of an electronic device, encased in a Faraday cage 4a, that is using the DSAE security architecture (1a) with one Power Distribution Unit 5a internal to the Faraday cage 4a and one battery 6a external to the Faraday cage 4a supplying power to the DSAE architecture, with one processing module (hardware) in each DSAE logical system (User 11a, Input 8a, Operational 9a, and Execution 10a systems).

Figure 11:
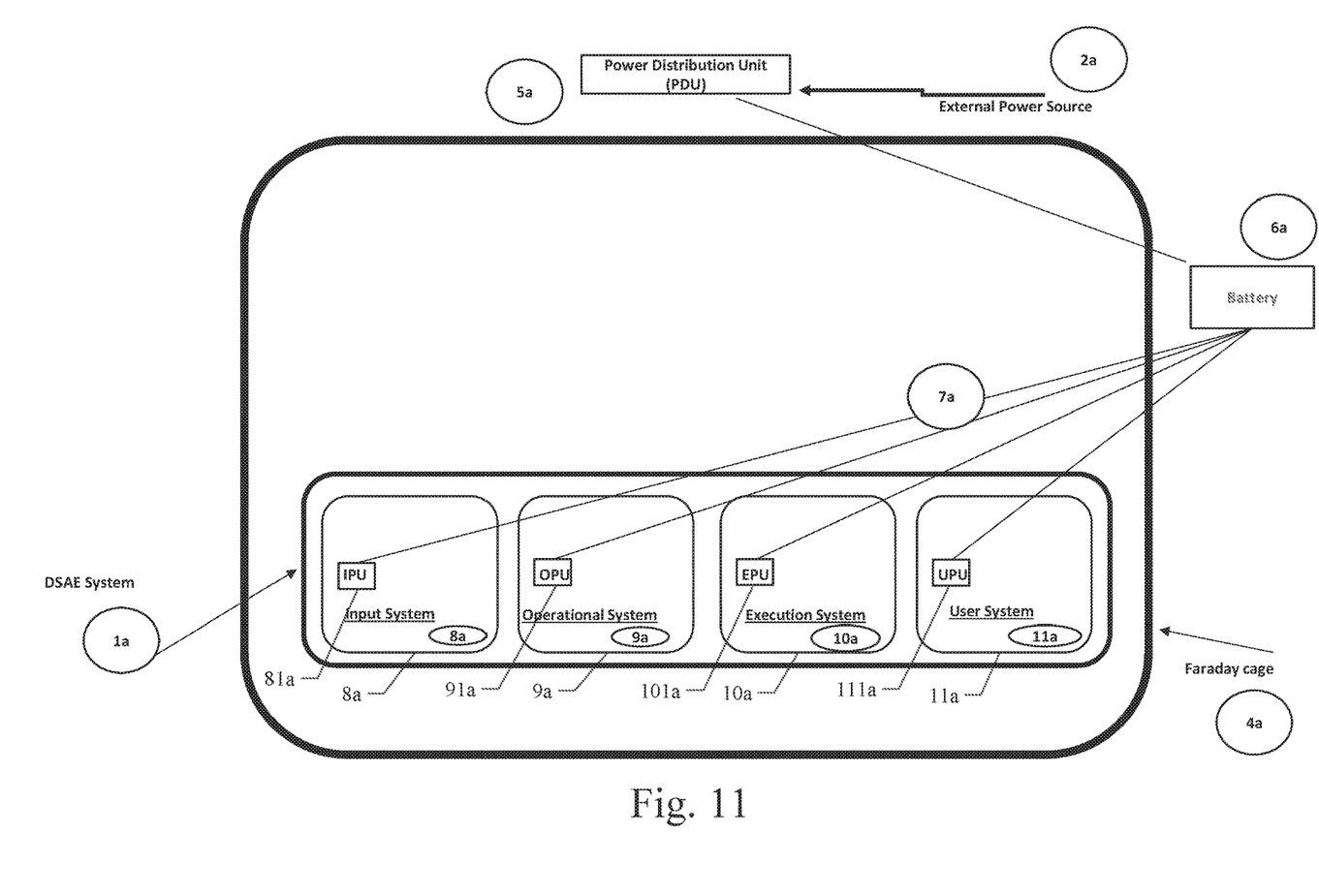
FIG. 11 illustrates an example embodiment of an electronic device, encased in a Faraday cage, that is using the DSAE security architecture and one Power Distribution Unit external to the Faraday cage and one battery external to the Faraday cage supplying power to the DSAE architecture, with one processing module (hardware) in each DSAE logical system (User, Operational, Execution and Input system).

FIG. 11 illustrates an example embodiment of an electronic device, encased in a Faraday cage 4a, that is using the DSAE security architecture (1a) with one Power Distribution Unit 5a external to the Faraday cage 4a and one battery 6a external to the Faraday cage 4a supplying power to the DSAE architecture, with one processing module (hardware) in each DSAE logical system (User 11a, Input 8a, Operational 9a, and Execution 10a systems).

In all figures, the systems of the DSAE system 1a (User 11a, Input 8a, Operational 9a, and Execution 10a systems) have the ability to monitor the status of the batteries 6a being supplied to each DSAE system. The individual processing modules of each DSAE system have the ability to help monitor the batteries and power being supplied through software. Additionally, software in the Power Distribution Unit 5a and batteries 6a can determine when the batteries 6a are running low of power and also if the Power Distribution Units 5a are no longer functioning or receiving power themselves. If multiple Power Distribution Units 5a are in use, then additional software in the PDUs 5a keeps a heartbeat or keep-alive signal between the PDUs 5a to monitor the other PDUs 5a functional state.

In all figures, the systems of the DSAE system 1a (User 11a, Input 8a, Operational 9a, and Execution 10a systems) include the hardware modules of the system, which are referenced by 81a (Input Processing Unit, aka IPU), 91a (Operational Processing Unit, aka OPU), 101a (Execution Processing Unit, aka EPU), and 111a (User Processing Unit, aka UPU).

Although described with reference to embodiments, it should be readily apparent to those of ordinary skill in the art that various changes, modifications and substitutes are intended within the form and details thereof, without departing from the intended spirit and scope. Accordingly, it will be appreciated that in numerous instances some features will be employed without a corresponding use of other features. Further, those skilled in the art will understand that variations can be made in the number and arrangement of components illustrated in the above figures.

What is claimed is:

1. A method of providing security to a device, the device including one or more input processing units within an input system built into the device, one or more control processing modules within a control system built into the device, one or more execution processing modules within an execution system built into the device, and a multi-channel internal communication bus built into the device, whereby at least one of the input processing units, at least one of the control processing modules, and at least one of the execution processing modules are coupled for data and control transmissions therebetween, and wherein the device is adapted to communicate with an external communications network and receive a plurality of external messages over a period of time at the one or more input processing units, the method comprising:
configuring the one or more input processing units to each present a different attack surface at different intervals within the period of time to the received plurality of external messages from the external communications network, each different attack surface corresponding to a different processor executing a different instruction set and a different operating system;
executing solely within the one or more execution processing modules a corresponding one of a plurality of applications; and
using a Faraday Cage to protect the device from electromagnetic pulse (EMP) events or attacks.

2. The method of claim 1 wherein an external power source powers a Power Distribution Unit (PDU) that in turn, charges or powers a battery, which then powers hardware processing modules in the device.

3. The method of claim 2 wherein the PDU being internal to the Faraday Cage.

4. The method of claim 2 wherein the PDU being external to the Faraday Cage.

5. The method of claim 2 wherein the battery being internal to the Faraday Cage.

6. The method of claim 2 wherein the battery being external to the Faraday Cage.

7. The method of claim 1 wherein each different attack surface is presented at different intervals by configuring the one or more input processing units within the input system, each which have different hardware therein.

8. The method of claim 1 wherein each different attack surface is presented at different intervals by configuring the one or more control processing modules within the control system, each which have different hardware therein.

9. The method of claim 1 wherein each different attack surface is presented at different intervals by configuring the one or more execution processing modules within the execution system, each which have different hardware therein.

10. The method of claim 1 wherein each different attack surface is presented at different intervals by configuring one or more user processing modules within a user system, each which have different hardware therein.

11. The apparatus of claim 1 wherein each different attack surface is presented at different intervals by configuring one or more control processing modules within the control system, each which have different hardware therein.

12. An apparatus configured to provide for security from an external attack brought over an external communication network or a user input during a period of time, whereby the apparatus also receives a plurality of external messages over the period of time, the apparatus comprising:
one or more input processing units within an input system, built into the apparatus, receiving the plurality of external messages over the period of time at the one or more input processing units within the input system, each of the one or more input processing units within the input system being executable by a different processor and the different processor executing a different operating system that are each different from each other, and wherein the one or more input processing units within the input system validate each of the plurality of external messages and invalidate the external attack;
a control processor within a control system, built into the apparatus, to configure the one or more input processing units within the input system to each present a different attack surface at different intervals within the period of time to the received plurality of external messages from the external communications network, and thereby to the external attack, each different attack surface corresponding to a different processor executing a different instruction set and a different operating system, wherein the control processor within the control system includes one or more processors and operating systems that are each different from the one or more input processing units within the input system, and wherein the control processor within the control system is not directly connected to the external communication network;
an execution processor within an execution system, built into the apparatus, that includes one or more execution processing modules and one or more processors that execute one or more applications;
a multi-channel internal communication bus, built into the apparatus, for connecting the input processor within the input system, the control processor within the control system, and the execution processor within the execution system for data and control transmissions therebetween; and
a Faraday Cage to protect the apparatus from electromagnetic pulse (EMP) events or attacks.

13. The apparatus of claim 12 including an external power source to power a Power Distribution Unit (PDU) that in turn, charges or powers a battery, which then powers hardware processing modules in the apparatus.

14. The apparatus of claim 13 wherein the PDU being internal to the Faraday Cage.

15. The apparatus of claim 13 wherein the PDU being external to the Faraday Cage.

16. The apparatus of claim 13 wherein the battery being internal to the Faraday Cage.

17. The apparatus of claim 13 wherein the battery being external to the Faraday Cage.

18. The apparatus of claim 12 wherein each different attack surface is presented at different intervals by configuring one or more input processing modules units within the input system, each which have different hardware therein.

19. The apparatus of claim 12 wherein each different attack surface is presented at different intervals by configuring the one or more execution processing modules within the execution system, each which have different hardware therein.

20. The apparatus of claim 12 wherein each different attack surface is presented at different intervals by configuring one or more user processing modules within a user system, each which have different hardware therein.

* * * * *